US007561941B2

(12) United States Patent
Kwon et al.

(10) Patent No.: US 7,561,941 B2
(45) Date of Patent: Jul. 14, 2009

(54) AMBULATORY ROBOT AND METHOD FOR CONTROLLING THE SAME

(75) Inventors: Woong Kwon, Sungnam-si (KR); Suk-han Lee, Yong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 520 days.

(21) Appl. No.: 10/763,395

(22) Filed: Jan. 26, 2004

(65) Prior Publication Data
US 2005/0021180 A1 Jan. 27, 2005

(30) Foreign Application Priority Data
Jan. 25, 2003 (KR) .................. 10-2003-0005076

(51) Int. Cl.
G05B 19/416 (2006.01)
G06F 19/00 (2006.01)
B62D 51/06 (2006.01)
(52) U.S. Cl. .................. 700/245; 180/8.2; 180/8.3; 318/568.18; 700/253
(58) Field of Classification Search ............... 700/245, 700/253, 62, 256; 318/568.12, 568.18, 568.17; 180/8.5, 8.2, 8.3, 11.204; 701/23; 901/20
See application file for complete search history.

(56) References Cited

U.S. PATENT DOCUMENTS

| 4,657,104 A | * | 4/1987 | Holland | 180/211 |
| 5,610,488 A | * | 3/1997 | Miyazawa | 318/568.11 |
| 6,553,271 B1 | * | 4/2003 | Morrell | 700/75 |
| 6,697,709 B2 | | 2/2004 | Kuroki et al. | |
| 7,082,350 B2 | * | 7/2006 | Skoog | 700/245 |
| 2003/0009259 A1 | * | 1/2003 | Hattori et al. | 700/245 |
| 2003/0114960 A1 | * | 6/2003 | Takenaka et al. | 700/245 |
| 2003/0120388 A1 | | 6/2003 | Kuroki et al. | |

FOREIGN PATENT DOCUMENTS

| JP | 2001-138272 | * | 5/2001 |
| JP | 2001-157973 | | 6/2001 |
| JP | 2002-21068 | | 1/2002 |
| JP | 2002-210681 | | 7/2002 |

OTHER PUBLICATIONS

Adachi et al., "Mechanism and Control of a Leg-Wheel Hybrid Mobile Robot", 1999, IEEE, Proceedings of the 19999 IEEE/RSJ International Conference on Intelligent Robots and Systems, pp. 1792-1797.*

* cited by examiner

Primary Examiner—Thomas G Black
Assistant Examiner—Christine M Behncke
(74) Attorney, Agent, or Firm—Lee & Morse, P.C.

(57) ABSTRACT

An ambulatory robot including a lower body part having two or more legs and an upper body part installed on an upper end of the lower body part and capable of performing positional displacement by moving the lower body part, includes slope-detection means for sensing a slope of a floor, rotating means installed on a bottom surface of each of the two or more legs, and control means for controlling a motion of the ambulatory robot using the lower and upper body parts, wherein the control means controls a speed of revolution of the rotating means based on the slope of the floor, and controls the motion of the ambulatory robot so that the positional displacement of the ambulatory robot is performed by any of running, walking and sliding, depending on the controlled speed of revolution.

21 Claims, 8 Drawing Sheets

AMBULATORY ROBOT AND METHOD FOR CONTROLLING THE SAME

BACKGROUND OF THE INVENTION

1. Field of the Invention

The present invention relates to an ambulatory robot and a method for controlling the same. More particularly, the present invention relates to an ambulatory robot that performs a combination of wheel type movements and leg type movements and a method for controlling the ambulatory robot.

2. Description of the Related Art

The most basic apparatus for driving a movable robot is a four-wheeled driving apparatus. Four-wheeled movable robots have been widely used in industrial fields since the 1970's. Recently, movable robots have been used as cleaning robots, monitoring robots, serving robots, and the like. Four-wheeled movable robots have an advantage in that they are able to run stably without falling. They cannot, however, be widely used in practical applications, because they are only able to move on a flat surface and are not able to traverse a non-flat area, such as a step, a doorsill, or other similar obstacle. In addition, because four-wheeled movable robots are driven by a motor, they have a problem in that the weight and volume of the driving motor is necessarily increased in order to exert torque sufficient for enduring the loads of the four-wheeled robots. In order to make up for the disadvantage of those four-wheeled movable robots, bipedal ambulatory robots or multi-pedal (usually having four or six feet) ambulatory robots have been developed. In particular, Sony has developed a humanoid robot, which is an example of a bipedal ambulatory robot.

FIG. 1 illustrates a conventional bipedal ambulatory robot in a state of standing erect. Referring to the drawing, the bipedal ambulatory robot includes left and right legs for performing ambulation, a trunk, left and right arms, a head, and a control means.

Each leg includes a knee joint, an ankle, and a foot and is adapted to be connected to a lowermost end of the trunk in parallel thereto by way of a leg joint. In addition, each arm includes an elbow joint and a wrist joint and is connected to a right edge or a left edge of the upper part of the trunk by way of a shoulder joint. The head is adapted to be connected to an uppermost end of the trunk by way of a neck joint.

The control means includes a joint controller (not shown) for controlling each joint actuator for the bipedal ambulatory robot, and a signal-processing controller for performing a process corresponding to a signal received from each sensor (not shown).

FIG. 2 illustrates an internal construction of the bipedal ambulatory robot of FIG. 1 displaying the joints thereof. Referring to the drawing, the bipedal ambulatory robot includes a head 110, a pair of arms 130R, 130L (R and L, as used herein, indicate a right side and a left side, respectively), an upper body part including a trunk 150, and a lower body part including a pair of legs 170R, 170L for performing ambulation. The bipedal ambulatory robot includes a neck joint at a connecting part between the head 110 and the trunk 150, three joints, viz., a shoulder joint, an elbow joint, and a wrist joint, in each of the arms 130R, 130L, one joint at the connecting part (corresponding to a human's loins) between the trunk 150 and the lower body part, and three joints, viz., a leg joint, a knee joint, and an ankle joint, in each of the legs 170R, 170L. Here, to facilitate explanation, all joints are exemplarily illustrated as electric motors.

In the bipedal ambulatory robot, the neck joint includes a pitching axis 111, a rolling axis 113 and a yawing axis 115. The pitching axis allows the head to be rotated up and down, the rolling axis allows the head to be rotated left and right, and the yawing axis allows the head to be shaken left and right. Thus, the neck joint has three degrees of freedom.

Each of the shoulder joints includes a pitching axis 131R, 131L that allows the arm to be rotated up and down, a rolling axis 133R, 133L that allows the arm to be rotated left and right, and a yawing axis 135R, 135L that allows the arm to be shaken in front and behind. Each of the elbow joints includes a pitching axis 137R, 137L that allows a lower end of the arm to be rotated up and down, and a yawing axis 139R, 139L that allows the lower end of the arm to be shaken left and right. Each of the wrist joints includes a pitching axis 141R, 141L that allows the wrist to be rotated up and down, and a rolling axis 143R, 143L that allows the wrist to be rotated left and right. Thus, each of the arms 130R, 130L has seven degrees of freedom.

Each of the leg joints includes a pitching axis 171R, 171L that allows the leg to be rotated up and down, a rolling axis 173R, 173L that allows the leg to be rotated left and right, and a yawing axis 175R, 175L that allows the leg to be shaken in front and behind. Each of the knee joints includes a pitching axis 177R, 177L that allows a lower end of the leg to be rotated up and down. Each of the ankle joints includes a pitching axis 179R, 179L that allows the ankles to be rotated up and down, a rolling axis 181R, 181L that allows the ankles to be rotated left and right, and a yawing axis 183R, 183L that allows the ankles to be shaken left and right. Thus, each of the legs 170R, 170L has seven degrees of freedom.

As described above, the bipedal ambulatory robot has a total of thirty-four (34) degrees of freedom ($3+7\times2+3+7\times2=34$). The number of degrees of freedom of the bipedal ambulatory robot, however, is not limited to thirty-four (34) and may be increased or decreased by appropriately increasing or decreasing a number of joints.

FIG. 3 graphically illustrates a linear and non-interference multiple material point approximation model applied to the bipedal ambulatory robot of FIG. 1. Referring to the drawing, a 0-XYZ coordinate system indicates a rolling axis, a pitching axis and a yawing axis in an absolute coordinate system, while a 0'-X'Y'Z' coordinate system indicates a rolling axis, a pitching axis and a yawing axis in a moving coordinate system that moves with the bipedal ambulatory robot. In this context, i indicates the i-th material point. That is, $m_i$ indicates a mass of the i-th material point and $r'_i$ indicates a position vector of the i-th material point in the moving coordinate system. In addition, a mass of material point of the loins is indicated by $m_b$, and a ZMP (Zero Moment Point) of that material point is indicated by $r'_{ZMP}$.

The robot is adapted to control a displacement of each motor so that each respective joint follows a basic target-walking pattern. The sum of inertia and gravity of the generated target walk pattern is called target total inertia. The point where the moment of target total inertia becomes zero by removing the vertical component is called a ZMP. The floor reaction is applied to each leg of the robot. The resultant force of each leg is called an overall floor reaction and, a point on the floor, where the moment of the overall floor reaction turns to zero by removing the vertical component, is called a center point of the overall floor reaction. If the robot is walking ideally, the center point of the overall floor reaction coincides with the ZMP.

In general, a bipedal ambulatory robot is so designed that the joints or actuators thereof are driven according to a preset motion pattern and thus the walking motion of the robot is controlled. Herein, a loins motion pattern is determined on the basis of a legs motion pattern, a ZMP trajectory, a trunk motion pattern, a two-arms motion pattern and other arbitrarily selected patterns. In addition, the ZMP is considered as a point where the sole, i.e., the bottom, of one foot of the robot is correctly secured to the floor without any moment when the robot is walking.

In a non-precision multiple material point interference model, the moment equation is a type of linear equation. Here, each material point $m_i$ is expressed as a sphere having a center at a material point $r_i$ and a radius, which is proportional to the mass thereof. Furthermore, it is assumed that the loins of the robot 100 have a constant height ($r'_{hz}+r_{qz}$=constant) and the material point of each of the knees is equal to zero.

When the bipedal robot moves, the control means selects the pattern of movement of the legs, the pattern of movement of the two arms, the pattern of movement of the trunk, the trajectory of the ZMP, etc. in order to determine the conditions of the motion of each of the components including the ZMP trajectory, the motion of the trunk, the motion of the two arms, and the height and attitude of the legs. Here, the motion of the loins is selected only in terms of the Z' direction and is not considered in terms of X' and Y' directions. At this time, the moment around the pitching axis and the moment around the rolling axis ($M_x$, $M_y$) on the selected ZMP that will be generated as a result of the motions of the feet, the trunk and the two arms are computationally determined using the linear and non-interference multiple point approximation model. The moment on the ZMP that will be generated as a result of the horizontal plane motion of the loins ($r'_{hx}$, $r'_{hy}$) is also computationally determined using the linear and non-interference multiple material point approximation model. Thereafter, the balancing formula for the moments on the selected ZMP is derived on the moving coordinate system 0'-X'Y'Z' that moves with the robot following a linear and non-interference ZMP equation below.

$$+m_h H(\ddot{r}'_{hx}+\ddot{r}'_{qx}+g_x)-m_h g_z(r'_{hx}-r'_{zmp_x})=-M_y(t) \quad (1)$$

$$-m_h H(\ddot{r}'_{hy}+\ddot{r}'_{qy}+g_y)-m_h g_z(r'_{hy}-r'_{zmp_y})=-M_x(t)$$

Now, it is assumed that the following equations hold true, $$\ddot{r}=0 \quad (40)$$

$$r'_{hz}+r_{qz}=H(t) \quad (2)$$

$H(t)$=constant (with respect to time)

The horizontal plane trajectory of the loins is computationally determined by solving the ZMP equation expressed by Equation 1. For example, the ZMP equation can be solved by using a known method, such as Euler's method or a Runge/Kutta method, to obtain the numerical solution for the horizontal absolute position ($r_{hx}$, $r_{hy}$) of the loins as represented by the unknown variables. The target position of the ZMP is normally selected on the sole when the latter touches the floor. The numerical solution obtained here is an approximate solution ($r'_{hx}$, $r'_{hy}$) for the motion pattern of the loins that allows the robot to walk in a stable manner, which in particular represents the horizontal absolute position of the loins that allows the ZMP to progress to the target position. Now, the moment of the yawing axis that will be generated as the result of the motion of the loins (the moment of the yawing axis is generated in the loins) $M_{zh}$ is computationally determined by solving the equation below.

$$M_{zh}(t)=-m_h(\ddot{r}'_{hx}+\ddot{r}'_{qx}+g_x)(r'_h-r'_{zmp_y})+m_h(\ddot{r}'_{hy}+\ddot{r}'_{qy}+g_y)(r'_{hx}-r'_{zmp_x}) \quad (3)$$

Next, the rotational moment $M_z$ of the yawing axis on the established ZMP that will be generated as a result of the motions of the legs and trunk is computationally determined using the linear and non-interference approximation model. The balancing formula for the rotational moment $M_z$ of the yawing axis on the selected ZMP is also derived on the moving coordinate system 0'-X'Y'Z' that moves with the robot. That is, by putting the rotational moment $M_z$ of the yawing axis generated as a result of motions between the legs and the torso and the moment $M_{zh}$ generated by the approximate solution of the motion of the loins in the left side as the term of known variables, and by putting the rotational moment $M_{arm}$ of the yawing axis generated as a result of the motion of the material points of arms in the right side as the term of unknown variables, the linear and non-interference ZMP equation is derived as follows:

$$M_{arm}(\theta_{arm}, t)=-M_z(t)-M_{zh}(t) \quad (4)$$

The ZMP equation, such as Equation 4, is solved using a numerical solution, such as Euler's method or the Runge/Kutta method, to compensate the moments $M_z$ and $M_{zh}$ of the yawing axis, thereby computationally determining the arms motion pattern required for enabling stable walking. When computationally determining the arms motion pattern using the numerical solution, previously provided unknown variables for compensating the moments of the yawing axis are applied.

The stable ambulation of the bipedal ambulatory robot is controlled through the above process and the detailed control methods are conventionally disclosed.

However, bipedal ambulatory robots according to the prior art are inferior to general wheel-type robots in terms of maximum advance speed. The maximum walking speed of ASIMO, which is a representative bipedal ambulatory robot manufactured by Honda, is merely 1.6 km/hour. Therefore, efforts have been made to develop a running robot in order to increase the speed of leg type ambulatory robots. It is difficult, however, to produce an amount of torque needed for a robot to run with existing actuators. Thus, the actuators should be enlarged in order to produce sufficient torque for running.

SUMMARY OF THE INVENTION

The present invention has been made in an effort to solve at least some of the above-mentioned problems occurring in the prior art. A feature of an embodiment of the present invention is to provide an ambulatory robot that performs walking and running motions depending on the surrounding circumstances without requiring larger actuators, and a method for controlling the robot.

In an effort to provide the above feature, an embodiment of the present invention provides an ambulatory robot including a lower body part having two or more legs and an upper body part installed on an upper end of the lower body part and capable of performing positional displacement by moving the lower body part, the ambulatory robot including slope-detection means for sensing a slope of a floor, rotating means installed on a bottom surface of each of the two or more legs, and control means for controlling a motion of the ambulatory robot using the lower and upper body parts, wherein the control means controls a speed of revolution of the rotating means based on the slope of the floor, and controls the motion of the ambulatory robot so that the positional displacement of the ambulatory robot is performed by any of running, walking and sliding, depending on the controlled speed of revolution.

Preferably, the ambulatory robot further includes a decelerating means for slowing the speed of revolution of the rotating means, wherein the control means controls the decelerating means thereby controlling the speed of revolution of the rotating means.

In the ambulatory robot, the control means may control the decelerating means so that the speed of revolution slows to zero when the slope of the floor sensed by the slope-detection means is greater than a first preset angle. In the ambulatory robot, the control means may control the motion of the ambulatory robot so that the positional displacement of the ambulatory robot is performed by walking when the speed of revolution equals zero. In the ambulatory robot, the control means may control the motion of the ambulatory robot so that the positional displacement of the ambulatory robot is performed by sliding when the slope of the floor sensed by the slope-detection means is less than the first preset angle but not less than a second preset angle.

Preferably, the rotating means includes two or more wheels.

According to another feature of an embodiment of the present invention, there is provided a method for controlling an ambulatory robot, the ambulatory robot including a lower body part having two or more legs and an upper body part installed on an upper end of the lower body part and performing positional displacement by moving the lower body part, the method including sensing a slope of a floor, controlling a speed of revolution of a rotating means that is installed on a bottom surface of each of the two or more legs based on the slope of the floor, and controlling a motion of the ambulatory robot using the upper and lower body parts so that the positional displacement of the robot is performed by any of running, walking or sliding, depending on the controlled speed of revolution.

In the method, controlling the speed of revolution may include slowing the speed of revolution of the rotating means while the rotating means is rotating. Further, controlling the speed of revolution may include slowing the speed of revolution so that the speed of revolution slows to zero when the slope of the floor sensed in the step of sensing the slope is greater than a first preset angle. In the method, controlling the speed of revolution may control the motion of the ambulatory robot so that the positional displacement of the ambulatory robot is performed by walking when the speed of revolution equals zero. In the method, controlling the speed of revolution may control the motion of the ambulatory robot so that the positional displacement of the ambulatory robot is performed by sliding when the slope of the floor sensed by the slope-detection means is less than the first preset angle but greater than a second preset angle.

Preferably, the rotating means includes two or more wheels.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1:
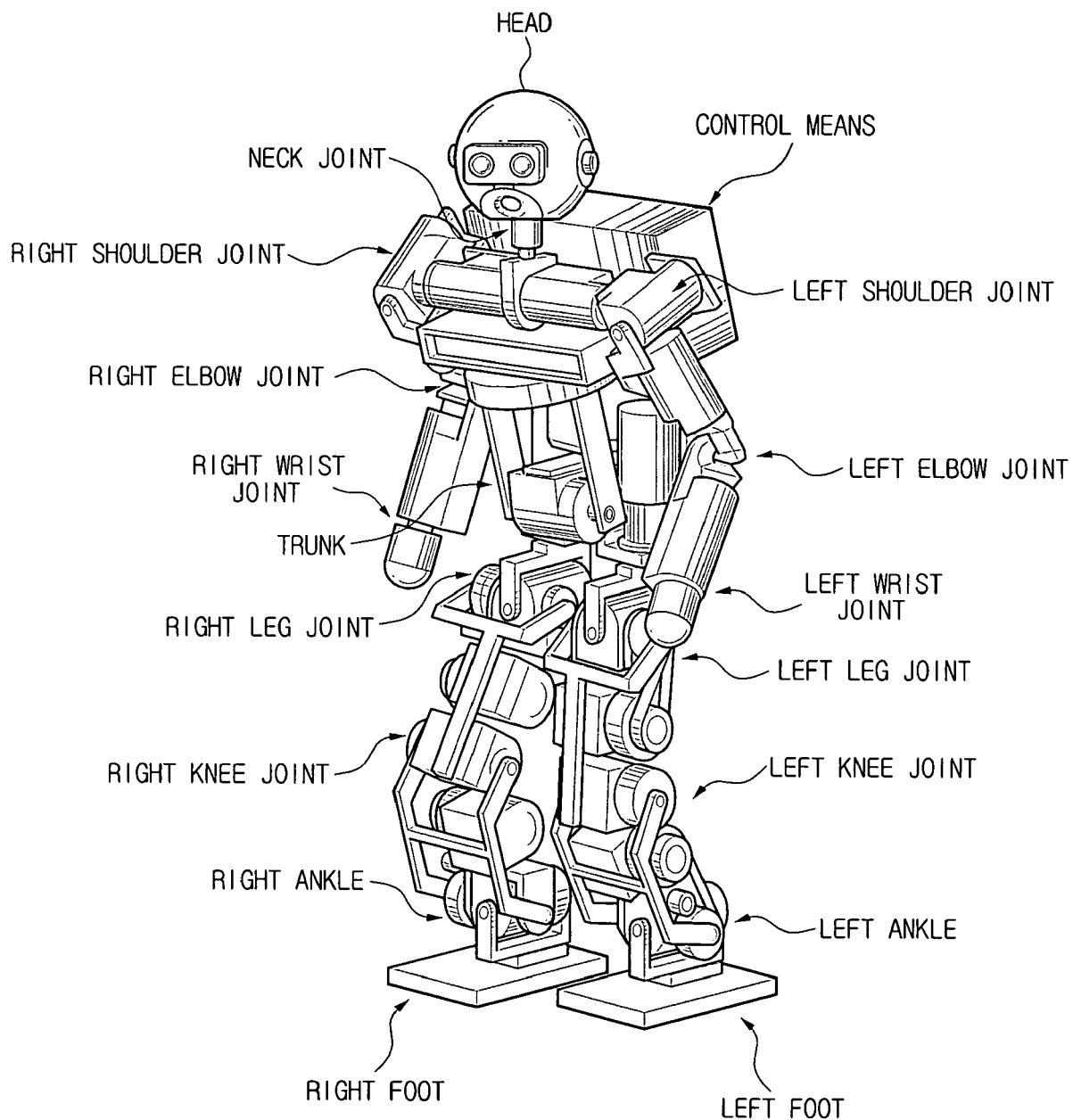
FIG. 1 illustrates a conventional bipedal ambulatory robot in the standing erect state.

Korean Application No. 2003-5076, filed Jan. 25, 2003, and entitled: "Ambulatory Robot and Method for Controlling the Same," is incorporated by reference herein in its entirety.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 4:
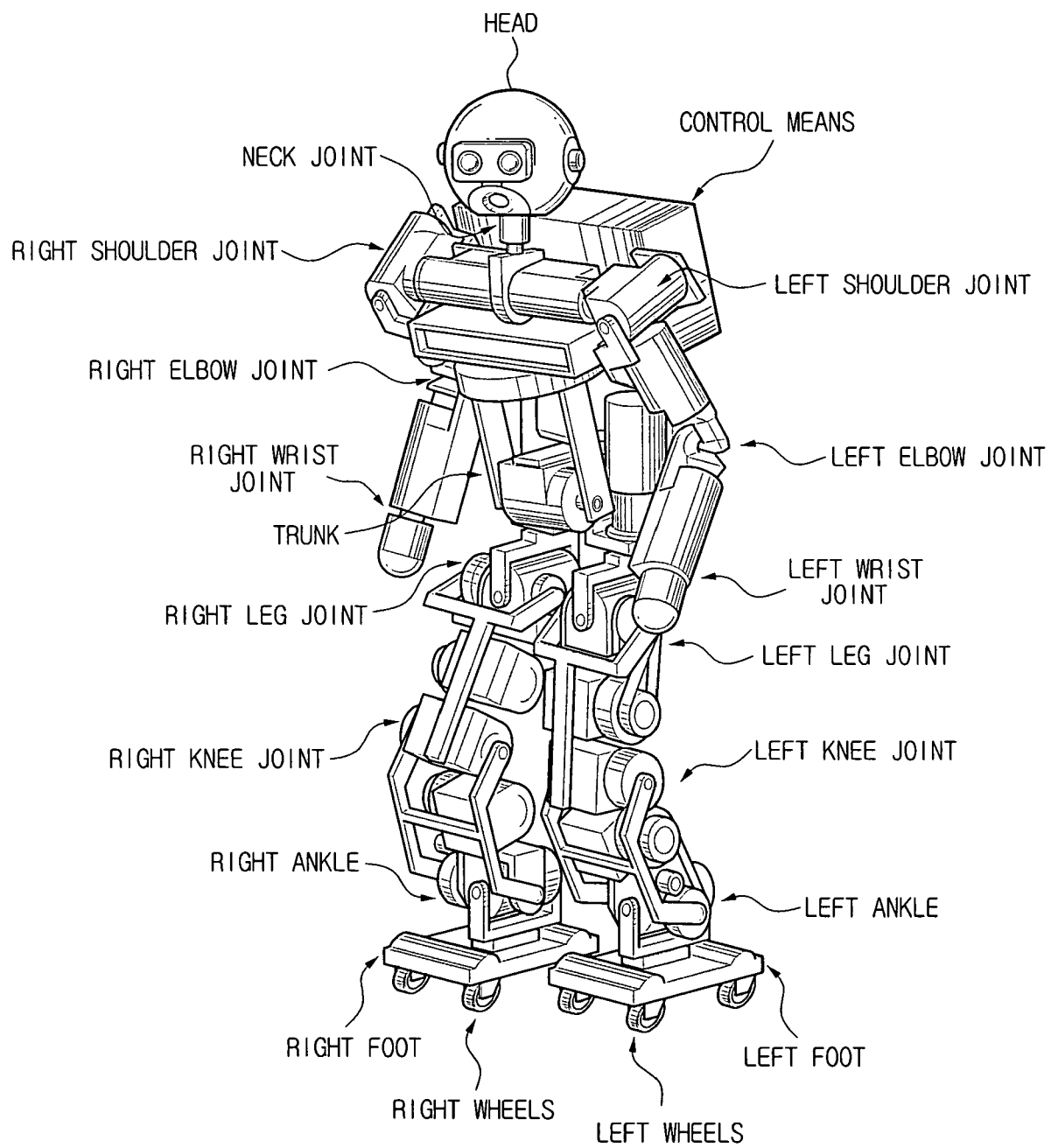
FIG. 4 illustrates an example of an ambulatory robot according to an embodiment of the present invention.

FIG. 4 illustrates an example of an ambulatory robot according to an embodiment of the present invention. Herein, the ambulatory robot will be described with reference to a bipedal ambulatory robot with two feet by way of example. Referring to the drawing, the bipedal ambulatory robot includes two legs, i.e., a right leg and a left leg, for performing ambulation, a trunk, a left arm and a right arm, a head, and a control means.

Each leg includes a knee joint, an ankle, and a foot and is adapted to be connected to the lowermost end of the trunk in parallel thereto by way of a leg joint. In addition, each arm includes an elbow joint and a wrist joint and is connected to a right or a left edge of the upper part of the trunk by way of a shoulder joint. The head is adapted to be connected to an uppermost end of the trunk by way of a neck joint.

A foot, which is respectively provided on a lower end of each of the legs, is provided with a plurality of wheels as rotating means in the sole, i.e., on the bottom, thereof. It is preferable that the wheels are implemented with elastic members in order to increase frictional forces against the ground or floor. Although the rotating means is illustrated as being implemented with wheels in the present embodiment, the rotating means is not limited to wheels. For example, the rotating means may be implemented with caterpillars, i.e., an endless track arrangement. In addition, although the drawing illustrates four wheels arranged in a four-cornered pattern, the present invention is not limited to such an arrangement. For example, the arrangement may be modified in such a way that three wheels are arranged in a row or in a three-cornered pattern.

The control means includes a joint controller (not shown) for controlling each joint actuator for the bipedal ambulatory robot, and a signal-processing controller for performing a process corresponding to a signal received from each sensor (not shown).

Figure 2:
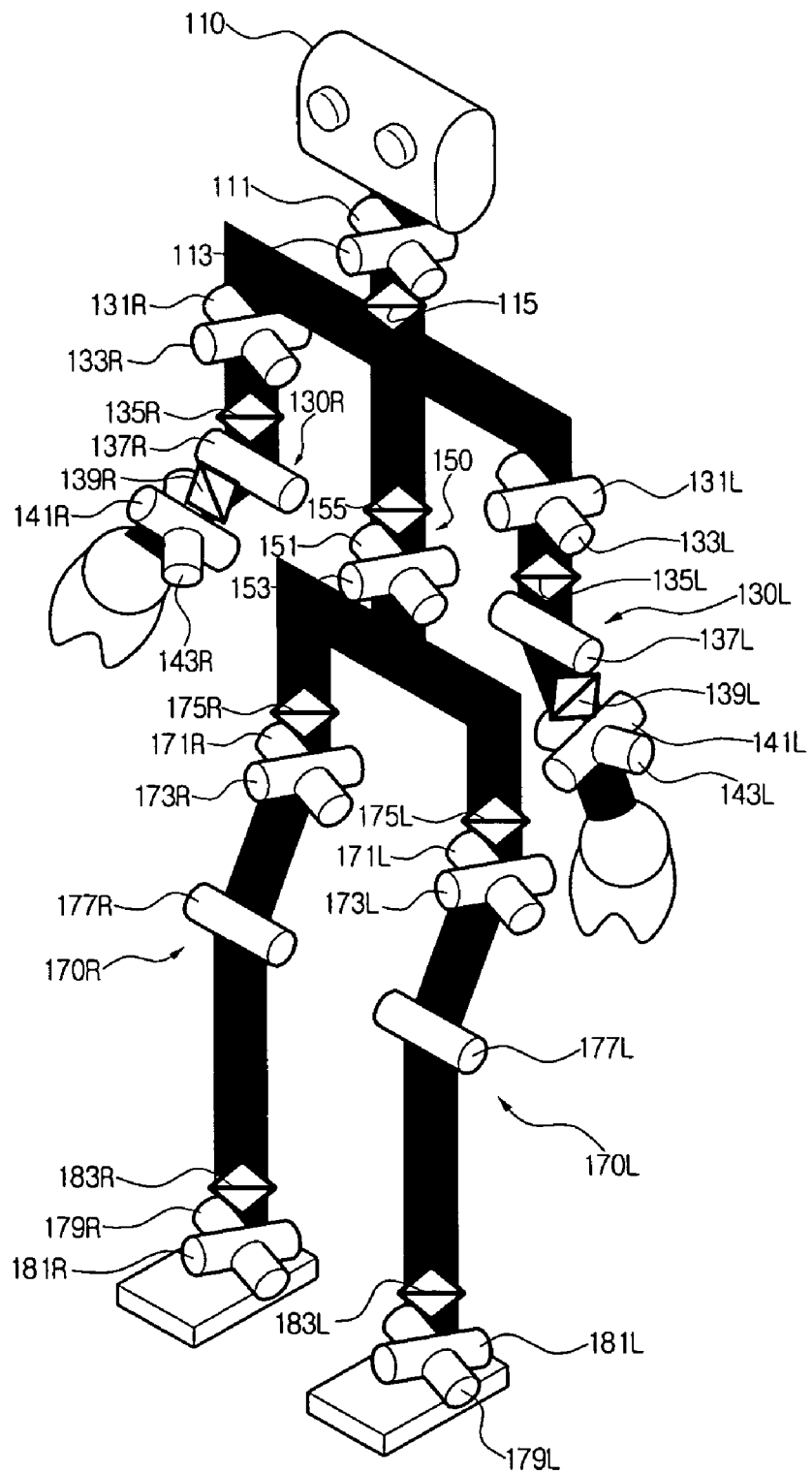
FIG. 2 illustrates an internal structure of the bipedal ambulatory robot of FIG. 1 displaying joints of the robot.
Figure 3:
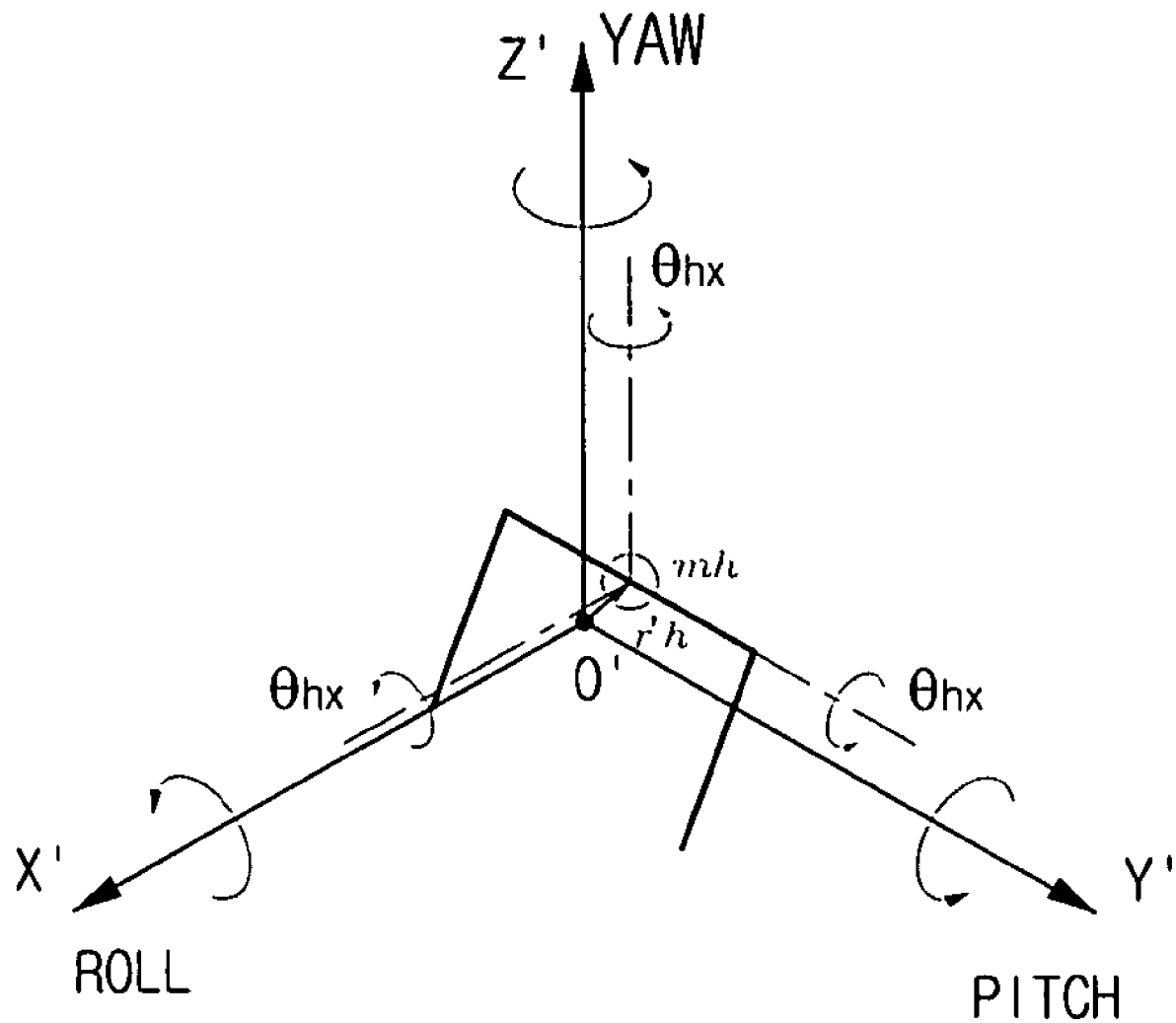
FIG. 3 graphically illustrates a linear and non-interference multiple material point approximation model applied to the bipedal ambulatory robot of FIG. 1.
Figure 5:
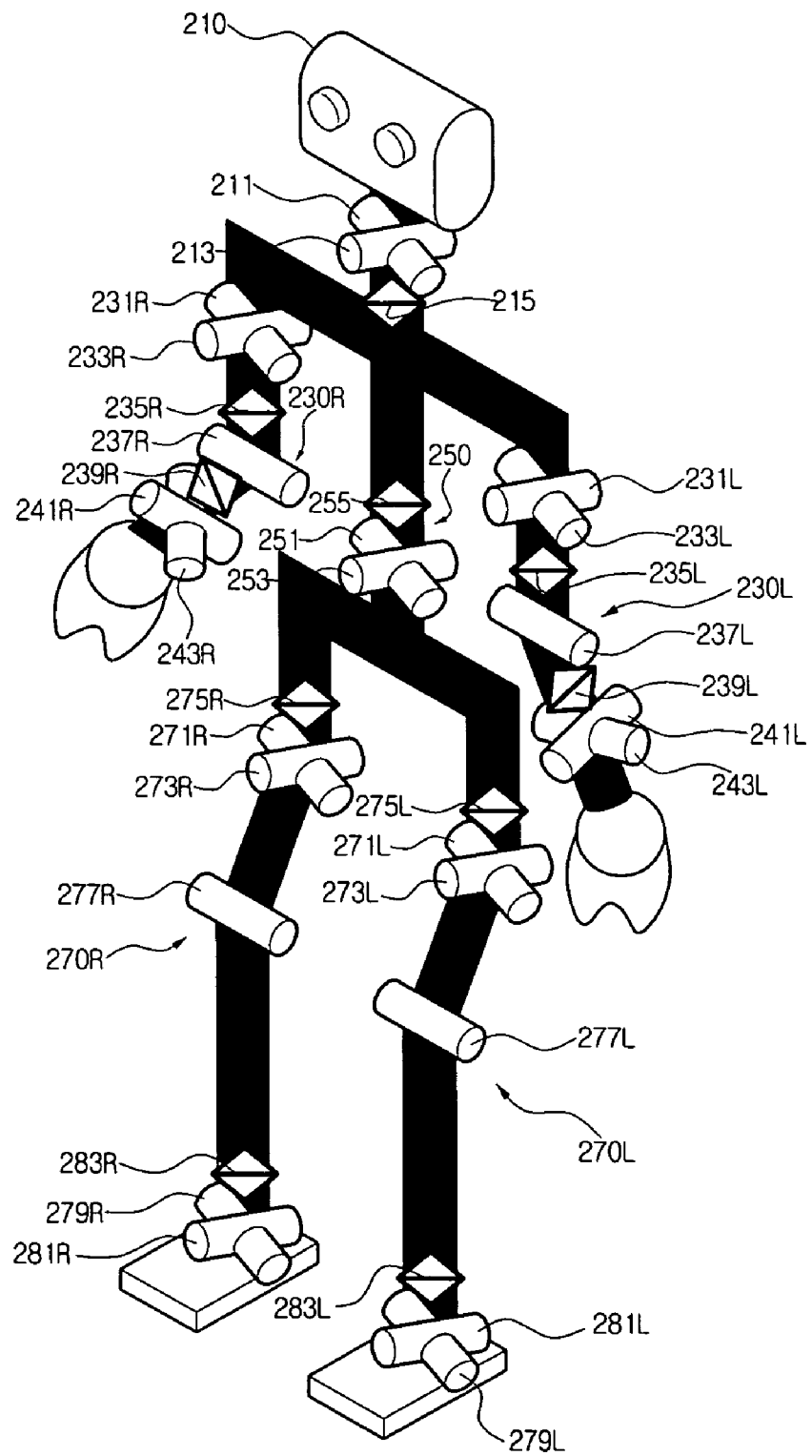
FIG. 5 illustrates an internal structure of the ambulatory robot of FIG. 1 displaying the joints of the robot.

FIG. 5 illustrates an internal structure of the bipedal ambulatory robot of FIG. 4 displaying the joints of the robot. The names of respective joints are identical to those shown in FIG. 2 and thus the joints are indicated by same names and similar reference numerals (reference numerals in the 100s are used in FIG. 2 and corresponding reference numerals in the 200s are used in FIG. 5) as those used for the joints of FIG. 2. Referring to the drawing, the bipedal ambulatory robot includes a head 210, a pair of arms 230R, 230L (R and L, as used herein, indicate a right side and a left side, respectively), an upper body including a trunk 250, and a lower body including a pair of legs 270R, 270L for performing ambulation. The bipedal ambulatory robot includes a neck joint at the connecting part between the head 210 and the trunk 250, three joints in each of the arms 230R, 230L, one joint at the connecting part (corresponding to human's loins) between the trunk 250 and the lower body part, and three joints in each of the legs 270R, 270L. The number of degrees of freedom provided in the ambulatory robot is the same as that of the ambulatory robot shown in FIG. 2, and the method for controlling the motion of the ambulatory robot with the upper and lower body parts using individual degrees of freedom is substantially similar to the prior art. Therefore, the description in this regard is omitted.

Figure 6:
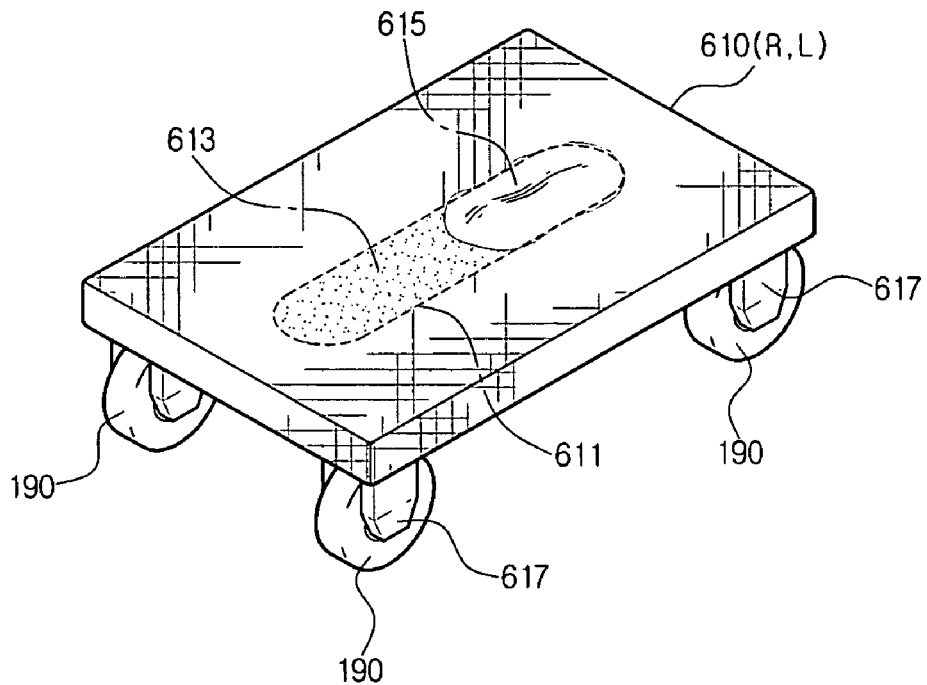
FIG. 6 illustrates a perspective view of an example of a slope-detection sensor provided in a foot of the movable robot of FIG. 4.

FIG. 6 illustrates an example of a slope-detection sensor installed in a foot of the ambulatory robot of FIG. 4. Referring to the drawing, a liquid storage space 611, within which a predetermined amount of liquid 613 may be stored, is provided in an internal side of each of the feet 610R, 610L. In this exemplary embodiment, the liquid 613 stored in the liquid storage space 611 is filled in the space together with a predetermined amount of air 615. The inner wall of the liquid storage space 611 is implemented to be able to detect the liquid-air interface, which changes depending on the slope of the floor, and to measure the slope angle of the floor based on the sensed interface. Therefore, it is preferable that the liquid 613 stored in the liquid storage space 611 is water, which has good flowability. Although the slope-detection sensor is shown as a liquid type slope-detection sensor, the slope-detection sensor is not limited thereto and may be implemented with, for example, a pendulum type slope-detection sensor, a balance type slope-detection sensor, an electromagnetic type slope-detection sensor using reflected electromagnetic waves, or the like.

Figure 7:
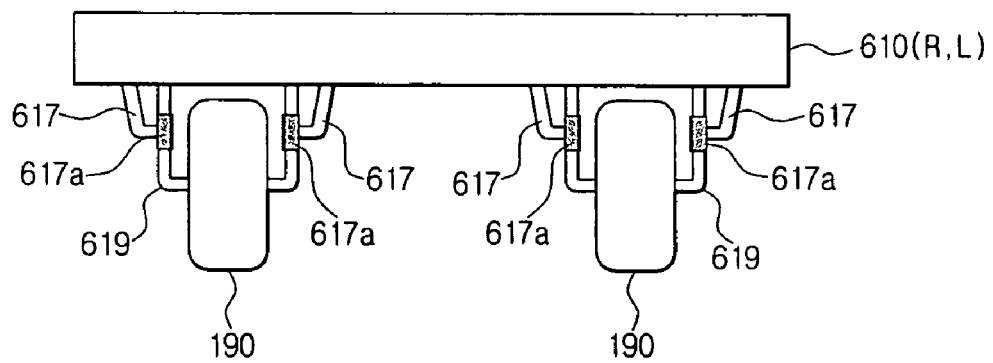
FIG. 7 illustrates a front view of an example of a brake provided in the foot of FIG. 6.

In addition, a plurality of decelerators 617 are provided in connection with each of the plurality of wheels 190 on the sole of each of the feet 610R, 610L of the ambulatory robot for slowing the speed of revolution of the wheels. The decelerators 617 are exemplified in FIG. 7. FIG. 7 illustrates a front view of the decelerators 617.

Referring to the drawing, the wheels 190 are arranged in an exemplary four-cornered pattern on the sole of each foot 610R, 610L of the ambulatory robot, in which each corner is provided with one wheel supported by a support abutment 619 to be rotatable about a rotational axis. In addition, decelerators 617 are provided in opposite sides of each of the wheels 190, and one end of each of the decelerators 617 is provided with an elastic member 617a. Although the drawing shows that opposite sides of each of the wheels 190 arranged in the four-cornered pattern in the sole of each of the feet 610R, 610L are provided with the decelerators 617, the present invention is not limited to this arrangement. For example, the decelerators 617 may be provided only in connection with the rear two wheels 190.

Figure 8:
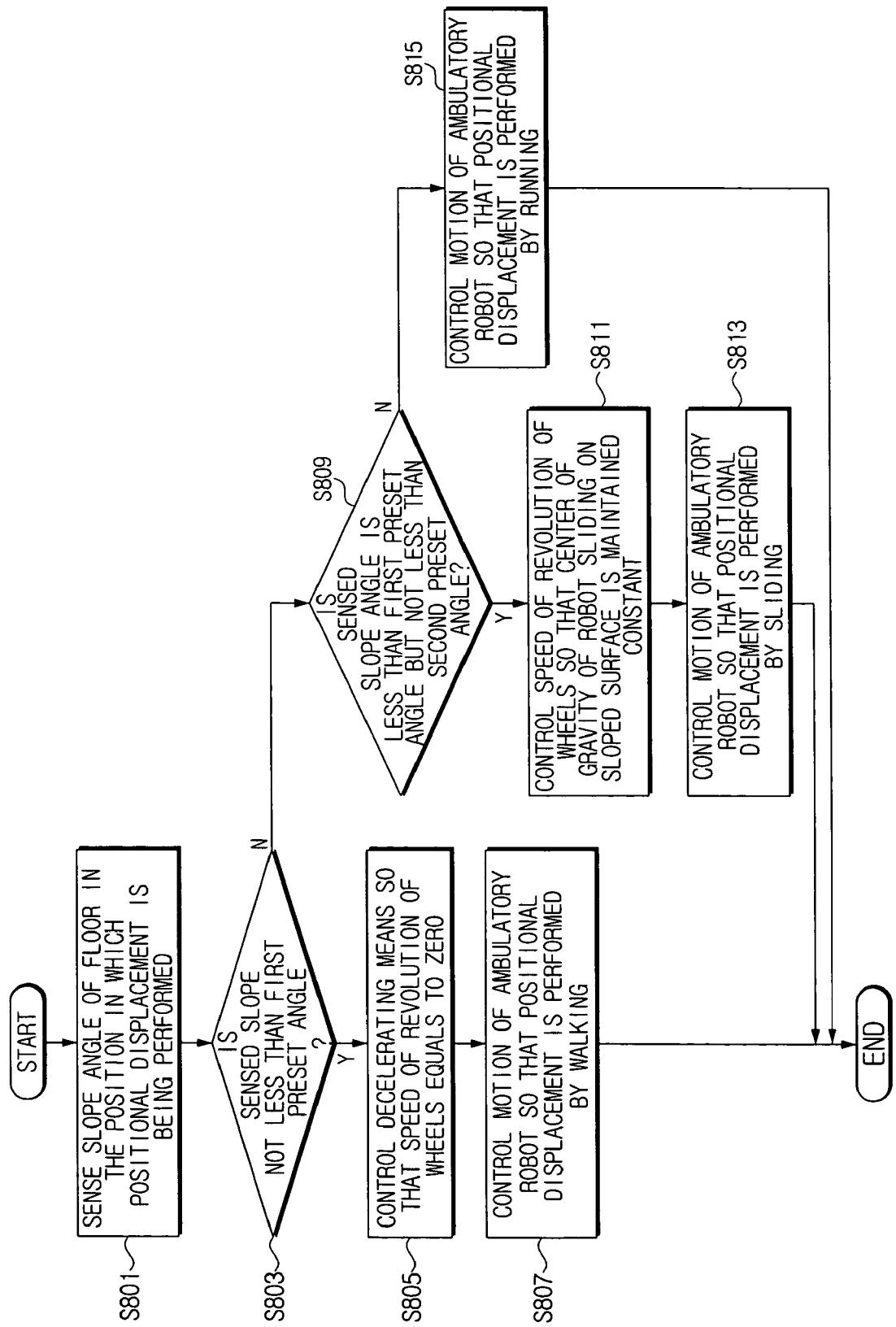
FIG. 8 is a flowchart for illustrating a method for controlling the movable robot of FIG. 4.

FIG. 8 is a flowchart for illustrating a method of controlling the ambulatory robot of FIG. 4. In step S801, the ambulatory robot detects a slope of a floor in a place where it is performing positional displacement, using one or more slope-detection sensors. For example, if the slope is sensed by the liquid type slope-detection sensor, as shown in FIG. 6, the angle between the liquid-air interface sensed by the inner surface of the liquid storage space 611 and the side surfaces of the liquid storage space 611 is the same as the slope of the floor at the place where the robot is performing positional displacement. In step S803, the slope angle sensed by the slope-detection sensor is transmitted to the control means and the control means determines whether the slope angle sensed by the slope-detection sensor is not less than a first preset angle. In step S805, if the sensed slope angle is not less than the first preset angle, the control means controls the decelerators 617 so that the speed of revolution of the wheels 190 slows to zero. The decelerators 617 slow the speed of revolution of the wheels 190 in response to the control of the control means. That is, the decelerators 617 are constructed to be able to apply pressure to the wheels on opposite sides of the wheels, and one end of each of the decelerators to be abutted against the wheels by the control of control means is provided with an elastic member 617a. If the control means commands to turn the speed of revolution of the wheels to zero, the decelerators 617 apply a preset maximum force to and compress the wheels 190, thereby slowing the speed of revolution of the wheels to zero. Here, the control of the decelerators 617 is preferably implemented to be performed in accordance with the slope angle of the floor at the moment when the foot of one leg, which is being moved by the motion of the whole body of the ambulatory robot controlled by the control means, touches the surface of the floor. For the purpose of real-time control of the decelerators 617 in accordance with the slope angle of the floor, the control of the speed of revolution of the wheels 190 may be implemented by a separate control means. After the speed of revolution of the wheels 190 becomes zero, in step S807, the control means controls the motion of the whole body of the ambulatory robot so that the positional displacement is performed by walking. In this case, the control means of the ambulatory robot calculates the ZMP in accordance with the conventional ZMP calculating method and controls the motion of the whole body based on the calculated ZMP equation.

If, in step S803, the control means determines that the sensed slope angle is less than the first preset angle, the method proceeds to step S809. In step S809, the control means compares the sensed slope angle to a second preset angle. If, in step S809, the slope angle sensed by the slope-detection sensor is less than the first preset angle but not less than the second preset angle, in step S811, the control means controls the speed of revolution of the wheels 190 based on the weight of the ambulatory robot and the sensed slope angle, so that the center of gravity of the ambulatory robot is maintained constant while it is sliding on a sloped surface. That is, assuming that the weight of the ambulatory robot is M and the slope angle is $\theta$, the acceleration is $g \cdot \sin\theta$ when the ambulatory robot slides along the sloped surface without performing any other motion of the whole body. Therefore, the velocity over a length of time t equals $tg \cdot \sin\theta$. Herein, the center of gravity of the ambulatory robot should be moved in parallel to the sloped surface at a velocity that is the same as the velocity of movement performed by the wheels v on the sloped surface. If the rotational moment I about the center of gravity of the ambulatory robot increases, the center of gravity should be displaced in the rear direction and in this state the ambulatory robot may lose balance and stumble. Therefore, the control means determines a state in which the sensed slope angle is less than the first preset angle but not less than the second preset angle as a controllable range in which the center of gravity is capable of being maintained constant, and thus controls the decelerators 617 so that the speed of revolution of the wheels 190 does not increase. If the speed of revolution of the wheels 190 is maintained constant, the control means controls the robot to take a posture using the upper and lower body parts so that the moving direction of the center of gravity is maintained constant and thus, in step S813, the positional displacement is performed by sliding while the robot slides along the sloped surface in the state that the posture is stably maintained without being disordered.

If, in step S809, the control means determines that the sensed slope angle is less than the first preset angle and less than the second preset angle, the method proceeds to step S815. If, in step S815, the sensed slope angle is also determined to be less than the second preset angle, the control means controls the motion of the whole body of the ambulatory robot so that the positional displacement is performed by running.

FIGS. 9a-9e illustrate in sequence from left to right a process of positional displacement by running of the ambulatory robot.

Figure 9:
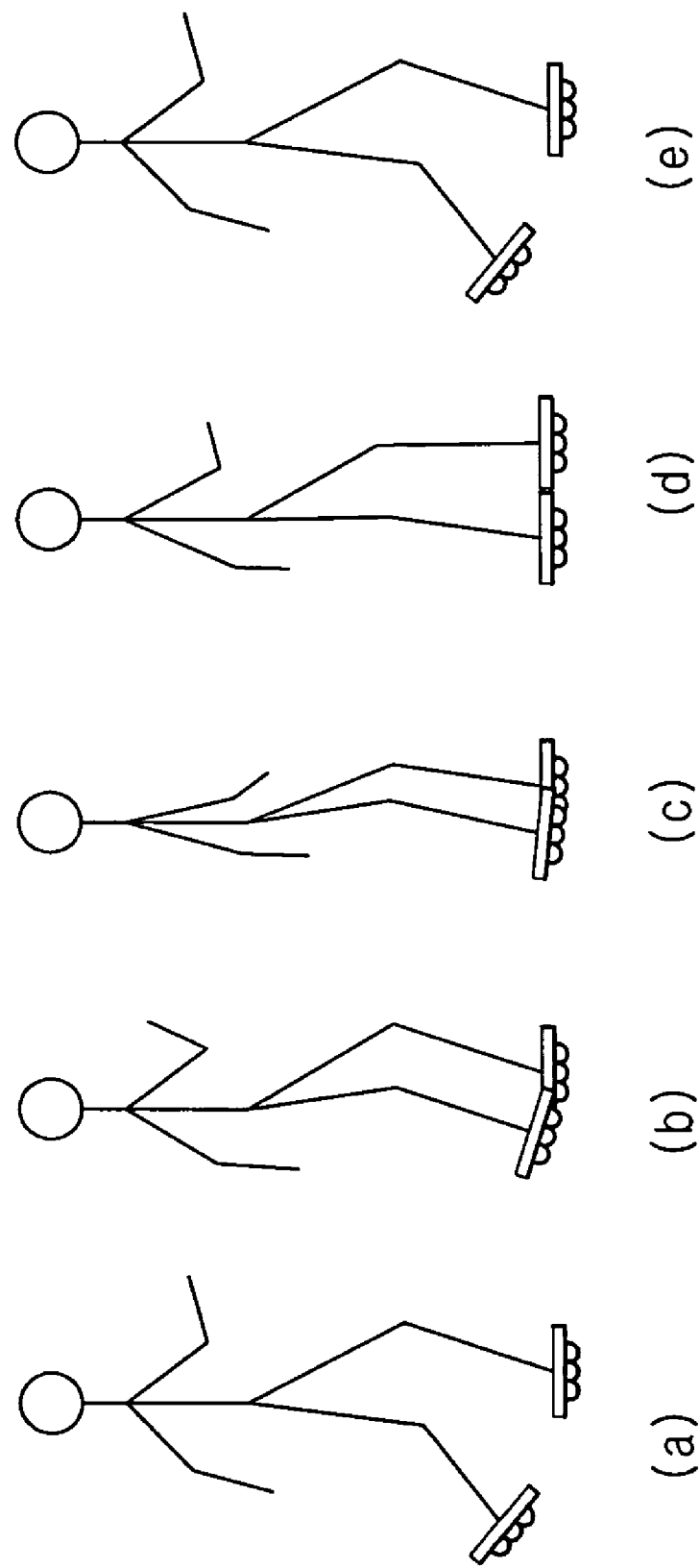
FIGS. 9a-9e illustrate the movable robot of FIG. 4 in a process of positional displacement by running.

For example, in FIG. 9a, considering from an initial state where the left foot touches the ground and the right foot is raised from the ground, the ZMP of the ambulatory robot is positioned in the left foot when the robot is moving. The control means of the ambulatory robot controls the motion of the whole body using dynamics in order to move the right foot forward, in FIGS. 9b-9e, and the left foot generates a rearward reaction while the right foot is moving forward. Resultantly, the ambulatory robot progresses to a state in which the right foot is on the ground and the left foot is raised, as shown in FIG. 9e. The generated reaction causes the wheels 190 to rotate forward due to the friction between the wheels 190 and the ground. The ambulatory robot will run forward by the rotational movements of the wheels, and the running velocity of the ambulatory robot is varied depending on the forward moving velocity of one foot while the other foot is touching the ground. During this process, the control means of the ambulatory robot corrects the moving trajectory and transmits an indicated value to each joint considering the entire dynamic based on each of the material points of the ambulatory robot in accordance with the position of the corrected ZMP. The correction of the ZMP trajectory and the control of joints according to the correction are identically applicable to the positional displacement by walking. The approximation model of the ZMP that is computationally determined based on each of the material points is as follows:

$$X_{ZMP} = \frac{\sum_{i=1}^{N} m_i(Z_i'' + g_z)x_i - \sum_{i=1}^{N} m_i x_i'' z_i + \sum_{i=1}^{N} I_{iy}\Omega_{iy}''}{\sum_{i=1}^{N} m_i(Z_i'' + g_z)y_i - \sum_{i=1}^{N} m_i y_i'' z_i + \sum_{i=1}^{N} I_{ix}\Omega_{ix}''} \quad (5)$$

$$Y_{ZMP} = \frac{\sum_{i=1}^{N} m_i(z_i'' - g_z)}{\sum_{i=1}^{N} m_i(z_i'' - g_z)}$$

wherein N is a number of material points, $m_i$ is a mass of the i-th material point, $z''_i$ is a z-directional acceleration of the i-th material point, $g_z$ is a z-directional acceleration of gravity, $x_i$ is an x-directional position vector of the i-th material point, $x''_i$ is an x-directional acceleration of the i-th material point, $y_i$ is a y-directional position vector of the i-th material point, $y''_i$ is a y-directional acceleration of the i-th material point, $z_i$ is a z-directional position vector of the i-th material point, $I_{iy}$ is a y-directional inertia moment of the i-th material point, $I_{ix}$ is an x-directional inertia moment of the i-th material point, $\Omega''_{ix}$ is an x-directional angular acceleration of the i-th material point, and $\Omega''_{iy}$ is a y-directional angular acceleration of the i-th material point.

The running, walking and sliding motions of the ambulatory robot as described above are executed in accordance with basic motion patterns. The patterned motions are converted into an algorithm and stored in a memory (not shown) in classified motion patterns, and the control means of the ambulatory robot reads out a proper motion pattern from the memory in accordance with the slope angle sensed by the slope-detection sensor and executes the control of the movements of the whole body.

The ambulatory robot in accordance with the present invention is controlled to execute a proper motion of the whole body in accordance with the surrounding circumstances, i.e., the slope of the floor on which the positional displacement of the robot is performed, and can perform rapid positional displacement. In addition, the ambulatory robot in accordance with the present invention can run at a speed that is much higher than that of a conventional bipedal ambulatory robot. Furthermore, because the ambulatory robot in accordance with the present invention performs positional displacement using wheels, it is able to save energy consumed per displacement distance as compared to a conventional bipedal ambulatory robot.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An ambulatory robot including a lower body part having two or more legs and an upper body part installed on an upper end of the lower body part and capable of performing positional displacement by moving the lower body part, the ambulatory robot comprising:
    slope-detection means for sensing a slope of a floor, the slope of the floor being defined only directly under the two or more legs of the ambulatory robot;
    rotating means installed on a bottom surface of each of the two or more legs; and
    control means for controlling a motion of the ambulatory robot using the lower and upper body parts,
    wherein the control means controls a speed of revolution of the rotating means and a speed of motion of the two or more legs of the ambulatory robot based on the slope of the floor, the control means being configured to vary the speed of motion of the two or more legs between at least three different values based on the slope of the floor, and
    wherein the control means controls the motion of the ambulatory robot so that the positional displacement of the ambulatory robot is performed by any of running, walking and sliding, depending on the controlled speed of revolution and on the speed of motion of the two or more legs.

2. The ambulatory robot as claimed in claim 1, further comprising:
    decelerating means for slowing the speed of revolution of the rotating means, wherein the control means controls the decelerating means thereby controlling the speed of revolution of the rotating means.

3. The ambulatory robot as claimed in claim 2, wherein the control means controls the decelerating means so that the speed of revolution slows to zero when the slope of the floor sensed by the slope-detection means is greater than a first preset angle.

4. The ambulatory robot as claimed in claim 3, wherein the control means controls the motion of the ambulatory robot so that the positional displacement of the ambulatory robot is performed by walking when the speed of revolution equals zero.

5. The ambulatory robot as claimed in claim 3, wherein the control means controls the motion of the ambulatory robot so that the positional displacement of the ambulatory robot is performed by sliding when the slope of the floor sensed by the slope-detection means is less than the first preset angle but not less than a second preset angle.

6. The ambulatory robot as claimed in claim 3, wherein the rotating means comprises two or more wheels.

7. The ambulatory robot as claimed in claim 1, wherein the slope-detection means is in the two or more legs of the ambulatory robot, the slope of the floor being determined by positioning a first leg of the ambulatory robot with a slope detection means on the floor, and the control means being configured to control the speed of motion of a second leg of the ambulatory robot based on the slope of the floor.

8. The ambulatory robot as claimed in claim 1, wherein the control means is configured to control speed of running of the ambulatory robot by controlling the speed of revolution of the rotating means and the speed of motion of the two or more legs of the ambulatory robot based on the slope of the floor.

9. The ambulatory robot as claimed in claim 1, wherein the control means is configured to control the motion of the ambulatory robot so that the positional displacement of the ambulatory robot is performed by walking when the slope of the floor sensed by the slope-detection means is greater than a first preset angle, by sliding when the slope of the floor sensed by the slope-detection means is less than the first preset angle but not less than a second preset angle, and by running when the slope of the floor sensed by the slope-detection means is less than the second preset angle.

10. A method for controlling an ambulatory robot, the ambulatory robot including a lower body part having two or more legs and an upper body part installed on an upper end of the lower body part and performing positional displacement by moving the lower body part, the method comprising:

sensing a slope of a floor;

controlling a speed of revolution of a rotating means that is installed on a bottom surface of each of the two or more legs based on the slope of the floor; and controlling a motion of the ambulatory robot using the upper and lower body parts so that the positional displacement of the robot is performed by any of running, walking or sliding, depending on the controlled speed of revolution with respect to the slope of the floor, so that the positional displacement of the ambulatory robot is performed by walking when the slope of the floor sensed by the slope-detector is greater than a first preset angle, by sliding when the slope of the floor sensed by the slope-detector is less than the first preset angle but not less than a second preset angle, and by running when the slope of the floor sensed by the slope-detector is less than the second preset angle.

11. The method as claimed in claim 10, wherein controlling the speed of revolution comprises:

slowing the speed of revolution of the rotating means while the rotating means is rotating.

12. The method as claimed in claim 11, wherein controlling the speed of revolution comprises:

slowing the speed of revolution so that the speed of revolution slows to zero when the slope of the floor sensed in the step of sensing the slope is greater than a first preset angle.

13. The method as claimed in claim 12, wherein controlling the speed of revolution controls the motion of the ambulatory robot so that the positional displacement of the ambulatory robot is performed by walking when the speed of revolution equals zero.

14. The ambulatory robot as claimed in claim 10, wherein controlling a motion of the ambulatory robot using the upper and lower body parts so that the positional displacement of the robot is performed by sliding includes maintaining a constant center of gravity of the ambulatory robot when the slope of the floor sensed by the slope-detector is less than the first preset angle but not less than a second preset angle, maintaining a constant center of gravity of the ambulatory robot including controlling a decelerator so the speed of revolution of the rotating means does not increase.

15. An ambulatory robot including a lower body part having two or more legs and an upper body part installed on an upper end of the lower body part and capable of performing positional displacement by moving the lower body part, the ambulatory robot comprising:

a slope-detector for sensing a slope of a floor;

a rotator on a bottom surface of each of the two or more legs;

a decelerator adjacent to the rotator and configured to slow a speed of revolution of the rotator;

a controller for controlling a motion of the ambulatory robot using the lower and upper body parts, wherein the controller controls a speed of revolution of the rotator via the decelerator based on the slope of the floor, and controls the motion of the ambulatory robot so that the positional displacement of the ambulatory robot is performed by any of running, walking and sliding, depending on the controlled speed of revolution, wherein the controller is configured to control the motion of the ambulatory robot so that the positional displacement of the ambulatory robot is performed by walking when the slope of the floor sensed by the slope-detector is greater than a first preset angle, by sliding when the slope of the floor sensed by the slope-detector is less than the first preset angle but not less than a second preset angle, and by running when the slope of the floor sensed by the slope-detector is less than the second preset angle.

16. The ambulatory robot as claimed in claim 15, wherein the controller controls the decelerator so that the speed of revolution slows to zero when the slope of the floor sensed by the slope-detector is greater than a first preset angle.

17. The ambulatory robot as claimed in claim 16, wherein the controller controls the motion of the ambulatory robot so that the positional displacement of the ambulatory robot is performed by walking when the speed of revolution equals zero.

18. The ambulatory robot as claimed in claim 16, wherein the rotator comprises two or more wheels.

19. The ambulatory robot as claimed in claim 18, wherein a plurality of decelerators is positioned on opposite sides of each wheel.

20. The ambulatory robot as claimed in claim 15, wherein the slope-detector is in a foot of an ambulatory robot.

21. The ambulatory robot as claimed in claim 20, wherein the slope-detector includes a liquid storage space in the foot.

* * * * *